US011188079B2

(12) United States Patent
Xie et al.

(10) Patent No.: US 11,188,079 B2
(45) Date of Patent: Nov. 30, 2021

(54) LASER RADAR SCANNING AND POSITIONING MECHANISMS FOR UAVS AND OTHER OBJECTS, AND ASSOCIATED SYSTEMS AND METHODS

(71) Applicant: SZ DJI TECHNOLOGY CO., LTD., Shenzhen (CN)

(72) Inventors: Jiebin Xie, Shenzhen (CN); Wei Ren, Shenzhen (CN); Zhipeng Zhan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 248 days.

(21) Appl. No.: 16/283,551

(22) Filed: Feb. 22, 2019

(65) Prior Publication Data

US 2019/0187711 A1 Jun. 20, 2019

Related U.S. Application Data

(63) Continuation of application No. PCT/CN2016/097540, filed on Aug. 31, 2016.

(51) Int. Cl.
*G05D 1/00* (2006.01)
*B64C 39/02* (2006.01)
(Continued)

(52) U.S. Cl.
CPC ......... *G05D 1/0094* (2013.01); *B64C 39/024* (2013.01); *B64D 47/08* (2013.01);
(Continued)

(58) Field of Classification Search
CPC .............. G05D 1/0094; B64C 39/024; B64C 2201/123; B64C 2201/127;
(Continued)

(56) References Cited

U.S. PATENT DOCUMENTS 4,710,819 A * 12/1987 Brown ................... F16M 11/10
212/76
9,253,460 B1 2/2016 Wang
(Continued)

FOREIGN PATENT DOCUMENTS

CN 103419942 A 12/2013
CN 103868521 A 6/2014
(Continued)

OTHER PUBLICATIONS

Johnson et. al., "Control Architecture for a UAV-Mounted Pan/Tilt/Roll Camera Gimbal", published Sep. 2005, all pages (Year: 2005).*
(Continued)

*Primary Examiner* — Calvin Cheung
(74) *Attorney, Agent, or Firm* — Finnegan, Henderson, Farabow, Garrett & Dunner, LLP

(57) ABSTRACT

Example embodiments include a motion mechanism that can be coupled between the main body of an unmanned movable object and the optoelectronic scanning module. The motion mechanism can include, e.g., a spinning device and a tilting device. The spinning device can be operable to rotate the scanning module relative to the main body about a spin axis. The tilting device can be operable, e.g., in response to a tilt angle input, to rotate the scanning module about an additional axis that is transverse to the spin axis. Further example embodiments include an orientation sensor installed on the main body of the unmanned movable object. Some embodiments also provide a controller that is configured to receive an orientation signal from the orientation sensor and, based at least in part on the orientation signal, determine a tilt value for the tilt angle input for the tilting device in the motion mechanism.

15 Claims, 6 Drawing Sheets

(51) Int. Cl.
B64D 47/08 (2006.01)
G01S 17/89 (2020.01)
G01S 17/933 (2020.01)

(52) U.S. Cl.
CPC ............ *G01S 17/89* (2013.01); *G01S 17/933* (2013.01); *B64C 2201/123* (2013.01); *B64C 2201/127* (2013.01); *B64C 2201/141* (2013.01)

(58) Field of Classification Search
CPC ... B64C 2201/141; B64D 47/08; G01S 17/89; G01S 17/933
See application file for complete search history.

(56) References Cited

U.S. PATENT DOCUMENTS

| | | | |
|---|---|---|---|
| 9,383,753 B1 | 7/2016 | Templeton et al. | |
| 2004/0173726 A1* | 9/2004 | Mercadal | F16M 11/12 248/660 |
| 2009/0216394 A1* | 8/2009 | Heppe | B64C 39/024 701/16 |
| 2011/0301784 A1* | 12/2011 | Oakley | G05D 1/0858 701/2 |
| 2014/0334668 A1* | 11/2014 | Saund | G06T 7/20 382/103 |
| 2014/0371952 A1* | 12/2014 | Ohtomo | G05D 1/106 701/2 |
| 2015/0207964 A1* | 7/2015 | Bye | H04N 5/2328 348/211.99 |
| 2016/0171330 A1* | 6/2016 | Mentese | G06T 7/20 348/170 |
| 2016/0216072 A1* | 7/2016 | McNeil | F41G 3/02 |
| 2016/0247115 A1* | 8/2016 | Pons | G06K 7/1413 |

FOREIGN PATENT DOCUMENTS

| | | |
|---|---|---|
| CN | 104819706 A | 8/2015 |
| CN | 104854428 A | 8/2015 |
| WO | WO 2016/101155 A1 | 6/2016 |

OTHER PUBLICATIONS

• Janney, R., "Back to Basics: The Pan, Tilt, and Zoom Camera Movements", Feb. 2018, Shutterstock Website, URL is https://www.shutterstock.com/blog/pan-tilt-zoom-camera-movements (Year: 2018).*
International Search Report dated Jun. 5, 2017, in corresponding PCT International Application.

* cited by examiner

LASER RADAR SCANNING AND POSITIONING MECHANISMS FOR UAVS AND OTHER OBJECTS, AND ASSOCIATED SYSTEMS AND METHODS

CROSS REFERENCE TO RELATED APPLICATION

The present application is a continuation of International Patent Application No. PCT/CN2016/097540, filed Aug. 31, 2016, which is incorporated herein by reference in its entirety.

TECHNICAL FIELD

The present disclosure is directed generally to unmanned movable apparatuses, and more specifically, to unmanned aerial vehicles with optoelectronic scanning modules, and associated components, systems and methods.

BACKGROUND

With their ever-increasing performance and lowering cost, unmanned aerial vehicles (UAVs) are now extensively used in many fields. Representative missions include crop surveillance, real estate photography, inspection of buildings and other structures, fire and safety missions, border patrols, and product delivery, among others. To improve flight safety as well as the user's experience (e.g., by making flight controls easier), it is important for UAVs to be able to detect obstacles independently and/or to automatically engage in evasive maneuvers. Laser radar (LIDAR) is a reliable and stable detection technology because it is able to function under nearly all weather conditions. However, traditional LIDAR devices are typically expensive and heavy, making most traditional LIDAR devices unfit for small and medium sized UAV applications.

Accordingly, there remains a need for improved techniques and systems for implementing LIDAR scanning functionality in UAVs and other objects.

SUMMARY

The following summary is provided for the convenience of the reader and identifies several representative embodiments of the disclosed techniques. An unmanned aerial vehicle (UAV) apparatus in accordance with a representative embodiment includes a main body, an orientation sensor carried by the main body, a scanning element carried by the main body, a controller, and a motion mechanism coupled between the main body and the scanning element. The motion mechanism includes a spinning device and a tilting device. The spinning device can be operable to rotate the scanning element relative to the main body about a spin axis. The tilting device can be operable to rotate the scanning element about an additional axis that is transverse to the spin axis in response to a tilt angle input. The controller can be configured to receive an orientation signal from the orientation sensor and, based at least in part on the orientation signal, determine a tilt value for the tilt angle input. In some examples, the spin axis is perpendicular to the additional axis. The orientation sensor can be one or more of a rotary encoder, or a Hall effect sensor.

In some embodiments, the motion mechanism includes an intermediate platform that the spinning device is configured to rotate. Some embodiments provide that the tilting device can be carried by the intermediate platform. In certain implementations, the spinning device can be configured to rotate the scanning element via the intermediate platform. In one or more configurations, the spinning device can carry the tilting device.

In one or more embodiments, the controller is configured to tilt the scanning element toward a direction of travel of the object. In accordance with certain embodiments, the controller is configured to compensate for a tilt angle of the main body when the main body is not level. In some examples, the controller is configured to compensate for a tilt angle of the main body by directing the scanning element to become level. One or more implementations provide that the controller is configured to adjust a tilt angle of the scanning element by directing the scanning element to become level at least once per revolution when the scanning element spins.

The scanning element can be configured to spin continuously at a generally constant rate. For example, the scanning element can be configured to spin at approximately 10 to 20 revolutions per second. In accordance with some embodiments, the tilting device comprises a servo motor positioned to tilt the scanning element. The scanning element can be weight balanced relative to the spin axis.

The scanning element can include a scanner. In a number of embodiments, the scanning element further includes a scanning platform that carries the scanner. In many implementations, the scanner is configured to perform a terrestrial survey, obstruction detection, or a combination thereof. Certain embodiments of the present technology also include the controller configured to maneuver the object in response to the terrain or an obstacle detected by the scanner. Some embodiments of the scanner can include a light detection and ranging (LIDAR) system, and in some examples, the LIDAR system can include a semiconductor laser diode configured to emit light at a pulse rate of approximately 1000 Hz or 3600 Hz. In accordance with many embodiments, the LIDAR system includes a single-line laser emitter. In a number of examples, the scanner includes a light emitting module and a light sensing module. The light emitting module can include an infrared (IR) light emitting diode (LED). The light sensing module can include a photodiode.

The controller, according to some implementations, can be configured to operate in a survey mode by performing a method that includes directing the object to level, rotating the scanning element to perform a first scan at a first tilt angle, and rotating the scanning element to perform a second scan at a second tilt angle.

In a variety of embodiments, a plurality of thrusters can be carried by the main body and positioned to maneuver the object in response to inputs from the controller. The controller can be configured to, in a number of examples, tilt the scanning element toward a direction of travel of the object, and maneuver the object in response to the terrain or an obstacle detected by a sensor carried by the scanning element. For example, the thrusters can include airfoils, and in some cases, the thrusters can include four propellers.

Embodiments of the present technology can also include a radio frequency module, coupled to the controller, to receive maneuvering commands from a remote controlling device.

Further embodiments include a method of controlling a system that includes any and all combinations of the devices described above, as well as a computer-readable medium that embodies computer instructions that implement such a method. Still a further embodiment includes manufacturing any and all combinations of the devices described above.

DETAILED DESCRIPTION

Figure 1A:
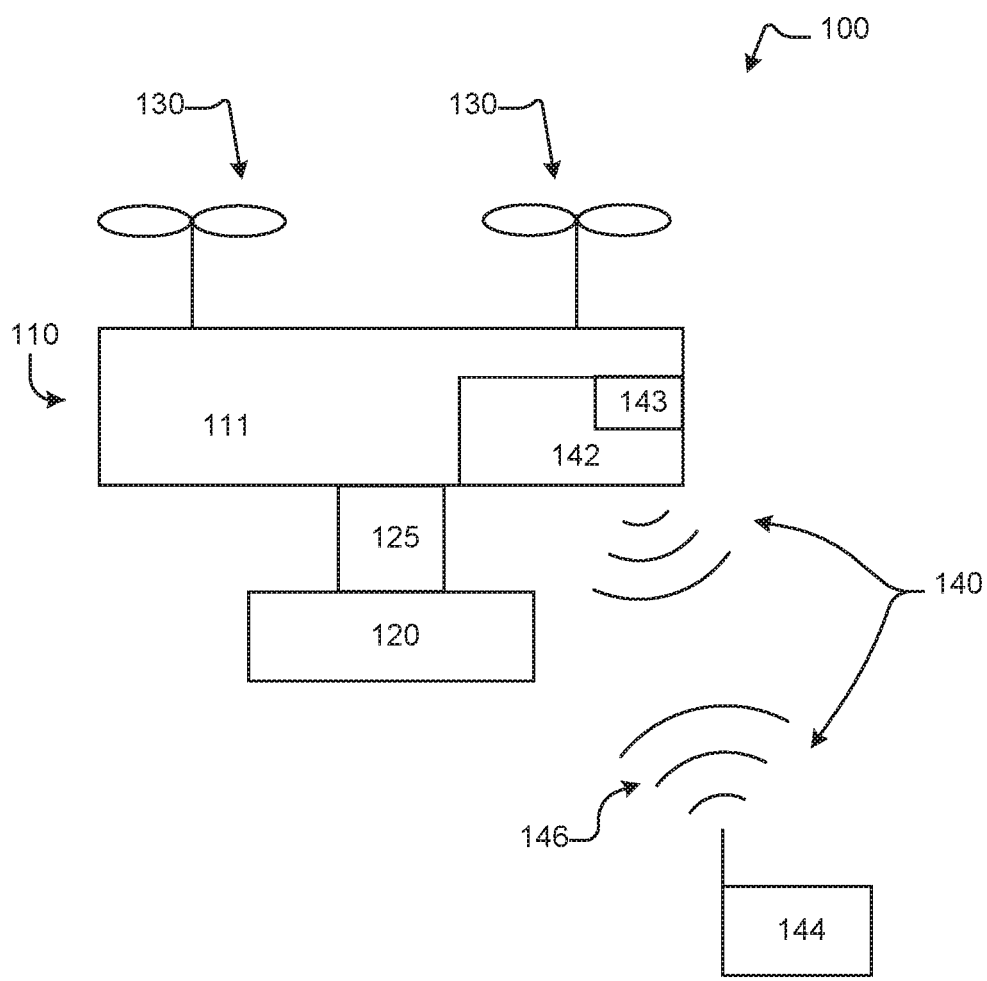
FIG. 1A is a schematic illustration of a representative system having a moveable object with elements configured in accordance with one or more embodiments of the present technology.

It is important for unmanned aerial vehicles (UAVs) to be able to independently detect obstacles and/or to automatically engage in evasive maneuvers. Light detection and ranging (LIDAR) is a reliable and stable detection technology because LIDAR can remain functional under nearly all weather conditions. However, traditional LIDAR devices are typically expensive and heavy, making most traditional LIDAR devices unsuitable for many UAV applications.

Accordingly, the present technology is directed to techniques for implementing a motion mechanism for carrying and operating an optoelectronic scanning module (e.g., a LIDAR module). The present technology enables the use of a single-line laser LIDAR module for three-dimensional scanning, thus lowering the cost to implement LIDAR on smaller or cheaper UAVs, while still producing advantages (e.g., high precision, and all-weather operation) the same as or similar to those associated with more expensive multi-line LIDAR variants. Example embodiments of the various techniques described herein include a motion mechanism that can be coupled between the main body of an unmanned movable object and the optoelectronic scanning module. The motion mechanism can include, e.g., a spinning device and a tilting device. The spinning device can be operable to rotate the scanning module relative to the main body about a spin axis. The tilting device can be operable, e.g., in response to a tilt angle input, to rotate the scanning module about an additional axis that is transverse to the spin axis. Further example embodiments include an orientation sensor installed on the main body of the unmanned movable object. Some embodiments also provide a controller that is configured to receive an orientation signal from the orientation sensor and, based at least in part on the orientation signal, determine a tilt value for the tilt angle input for the tilting device of the motion mechanism.

In the following description, the example of a UAV is used, for illustrative purposes only, to explain various techniques that can be implemented using a motion mechanism to carry a simpler LIDAR scanning module (e.g., a single-line LIDAR), to reduce or eliminate the need of traditional LIDAR implementations (e.g., multi-line LIDARs). In other embodiments, the techniques described here are applicable to other suitable scanning modules, vehicles, or both. For example, even though one or more figures described in connection with the techniques illustrate a UAV, in other embodiments, the techniques are applicable in a similar manner to other type of movable objects including, but not limited to, an unmanned land or water vehicle, a hand-held device, or a robot. In another example, even though the techniques are particularly applicable to laser beams produced by laser diodes in a LIDAR system, other types of light sources (e.g., other types of lasers, or light emitting diodes (LEDs)) can be applicable in other embodiments.

In the following description, numerous specific details are set forth to provide a thorough understanding of the presently disclosed technology. In other embodiments, the techniques described here can be practiced without these specific details. In other instances, well-known features, such as specific fabrication techniques, are not described in detail in order to avoid unnecessarily obscuring the present technology. References in this description to "an embodiment," "one embodiment," or the like, mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. Also, it is to be understood that the various embodiments shown in the Figures are merely illustrative representations and are not necessarily drawn to scale.

Several details describing structures or processes that are well-known and often associated with UAVs and corresponding systems and subsystems, but that can unnecessarily obscure some significant aspects of the disclosed techniques, are not set forth in the following description for purposes of clarity. Moreover, although the following disclosure sets forth several embodiments of different aspects of the present disclosure, several other embodiments can have different configurations or different components than those described in this section. Accordingly, the described techniques can have other embodiments with additional elements or without several of the elements described below.

Many embodiments of the present disclosure described below can take the form of computer- or controller-executable instructions, including routines executed by a programmable computer or controller. Those skilled in the relevant art will appreciate that the described techniques can be practiced on computer or controller systems other than those shown and described below. The techniques described herein can be embodied in a special-purpose computer or data processor that is specifically programmed, configured or constructed to perform one or more of the computer-executable instructions described below. Accordingly, the terms "computer" and "controller" as generally used herein refer to any data processor and can include Internet appliances and handheld devices (including palm-top computers, wearable computers, cellular or mobile phones, multi-processor systems, processor-based or programmable consumer electronics, network computers, mini computers and the like). Information handled by these computers and controllers can be presented at any suitable display medium, including a liquid crystal display (LCD). Instructions for performing computer- or controller-executable tasks can be stored in or on any suitable computer-readable medium, including hardware, firmware or a combination of hardware and firmware. Instructions can be contained in any suitable memory device, including, for example, a flash drive, USB device, and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements co-operate or interact with each other (e.g., as in a cause and effect relationship), or both.

1. Overview

FIG. 1A is a schematic illustration of a representative system 100 having elements in accordance with one or more embodiments of the present technology. The system 100 includes a movable object 110 and a control system 140. Although the movable object 110 is depicted as an unmanned aerial vehicle (UAV), this depiction is not intended to be limiting, and any suitable type of movable object can be used in other embodiments, as described herein.

The moveable object 110 can include a main body 111 (e.g., an airframe) that can carry a payload 120, for example, an imaging device or an optoelectronic scanning device (e.g., a LIDAR device). In particular embodiments, the payload 120 can be a camera, for example, a video camera and/or still camera. The camera can be sensitive to wavelengths in any of a variety of suitable bands, including visual, ultraviolet, infrared and/or other bands. In still further embodiments, the payload 120 can include other types of sensors and/or other types of cargo (e.g., packages or other deliverables). In many of these embodiments, the payload 120 is supported relative to the main body 111 with a carrying mechanism 125. The carrying mechanism 125, in some embodiments, can allow the payload 120 to be independently positioned relative to the main body 111. For instance, the carrying mechanism 125 can permit the payload 120 to rotate around one, two, three, or more axes. In other embodiments, the carrying mechanism 125 can permit the payload 120 to move linearly along one, two, three, or more axes. The axes for the rotational or translational movement may or may not be orthogonal to each other depending upon the particular embodiment. In this way, when the payload 120 includes an imaging device, the imaging device can be moved relative to the main body 111, e.g., to photograph, video or track a target.

In some embodiments, the payload 120 can be rigidly coupled to or connected with the movable object 110 such that the payload 120 remains generally stationary relative to the movable object 110. For example, the carrying mechanism 125 that connects the movable object 110 and the payload 120 may not permit the payload 120 to move relative to the movable object 110. In other embodiments, the payload 120 can be coupled directly to the movable object 110 without requiring the carrying mechanism 125. In some examples, the carrying mechanism can include a mechanical mechanism, such as a pan head or a ball head, that allows for adjustments in one or more axes. A pan head, also known as a pan-and-tilt head, may allow independent rotation of the payload about two or three perpendicular axes. A ball head may include a ball and socket type joint for orientation control; for example, the ball can sit in a socket, which can be tightened to lock the ball in place. Some implementations of the carrying mechanism can provide the ability to restrict movement to a single axis. Additionally, some carrying mechanisms may include electromechanical components to provide automated or assisted target tracking functionality.

Figure 1B:
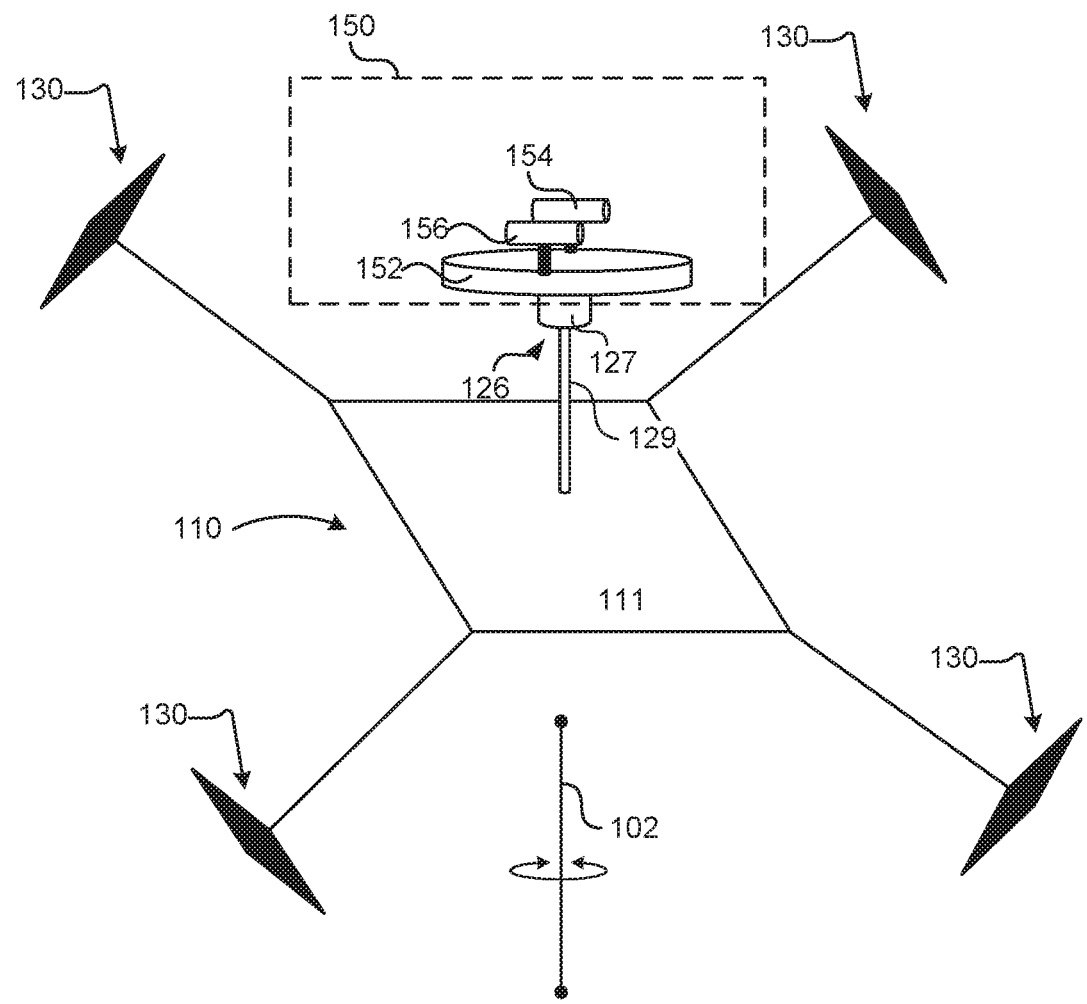
FIG. 1B is a schematic illustration of the movable object of FIG. 1A carrying a representative optoelectronic scanning module, in accordance with an embodiment of the present technology.

One or more propulsion units 130 can enable the movable object 110 to move, e.g., to take off, land, hover, and move in the air with respect to up to three degrees of freedom of translation and up to three degrees of freedom of rotation. In some embodiments, the propulsion units 130 can include one or more rotors. The rotors can include one or more rotor blades coupled to a shaft. The rotor blades and shaft can be rotated by a suitable drive mechanism, such as a motor. Although the propulsion units 130 of the moveable object 110 are depicted as propeller-based and can have four rotors (as shown in FIG. 1B), any suitable number, type, and/or arrangement of propulsion units can be used depending upon the particular embodiment. For example, the number of rotors can be one, two, three, four, five, or even more. The rotors can be oriented vertically, horizontally, or at any other suitable angle with respect to the moveable object 110. The pitch angle of the rotors can be fixed or variable. The propulsion units 130 can be driven by any suitable motor, such as a DC motor (e.g., brushed or brushless) or an AC motor. In some embodiments, the motor can be configured to mount and drive a rotor blade.

The movable object 110 is configured to receive control commands from the control system 140. In an embodiment shown in FIG. 1A, the control system 140 includes some components carried on the moveable object 110 and some components positioned off the moveable object 110. For example, the control system 140 can include a first controller 142 carried by the moveable object 110 and a second controller 144 (e.g., a human-operated, remote controller) positioned remote from the moveable object 110 and connected via a communication link 146 (e.g., a wireless link such as a radio frequency (RF) based link). The first controller 142 can include a computer-readable medium 143 that executes instructions directing the actions of the moveable object 110, including, but not limited to, operation of the propulsion system 130 and the payload 120 (e.g., a camera). The second controller 144 can include one or more input/output devices, e.g., display and control buttons. The operator manipulates the second controller 144 to control the moveable object 110 remotely, and receives feedback from the moveable object 110 via the display and/or other interfaces of the second controller 144. In other representative embodiments, the moveable object 110 can operate autonomously, in which case the second controller 144 can be eliminated, or can be used solely for operator override functions.

FIG. 1B schematically illustrates the moveable object 110 of FIG. 1A carrying a representative optoelectronic scanning module (or scanning element) 150. The scanning module 150 can be carried by a motion mechanism 126. The motion mechanism 126 can be the same as or similar to the carrying mechanism 125 for the payload 120, described above with reference to FIG. 1A. For example, as illustrated in FIG. 1B, the motion mechanism 126 includes a spinning device 127 (e.g., an electric motor) and a support rod 129. The motion mechanism 126 is coupled between the main body of the moveable object 110 and the scanning module 150 so as to connect the two together. Further, in a number of embodiments, the motion mechanism 126 is operable (e.g., either by control from the second controller 144 (FIG. 1A) or autonomously by programming) to rotate the scanning module 150 relative to the main body about a spin axis 102. Accordingly, the scanning module 150 can perform horizontal scans (e.g., 360 degree horizontal scans).

The optoelectronic scanning module 150 can include a scanning platform 152 carrying a light emitting module 154 and a light sensing module 156. The light emitting module 154 is positioned to emit light, and the light sensing module 156 is positioned to detect a reflected portion of the emitted light. In many implementations, the optoelectronic scanning module 150 is a LIDAR module, and the light emitting module 154 includes a semiconductor laser diode (e.g., a P-I-N structured diode). The light sensing module 156 can include photodetectors, e.g., solid state photodetectors (including silicon (Si)), avalanche photodiodes (APD), photomultipliers, or combinations of the foregoing. In some implementations, the semiconductor laser diode can emit a laser light at a pulse rate of approximately 1000 Hz or 3600 Hz.

In various embodiments, the scanning module 150 can perform a three-dimensional (3D) scanning operation, covering both horizontal and vertical directions, in order to detect obstacles and/or to conduct terrestrial surveys. Objects that can be detected typically include any physical objects or structures, including geographical landscapes (e.g., mountains, trees, or cliffs), buildings, vehicles (e.g., aircraft, ships, or cars), or indoor obstacles (e.g., walls, tables, or cubicles). Other objects include live subjects such as people or animals. The objects can be moving or stationary.

Figure 2:
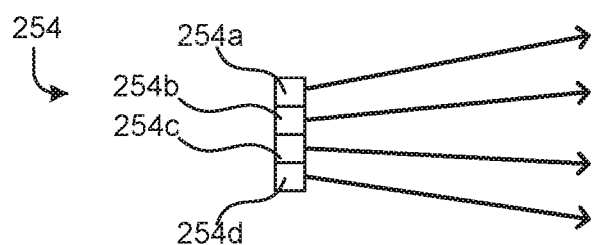
FIG. 2 is an enlarged view of a laser radar (LIDAR) light emitting module having multiple laser beam emitters used to scan vertically to cover potential obstacles at different altitudes.

FIG. 2 shows an enlarged view of a laser radar (LIDAR) light emitting module 254 having multiple laser beam emitters 254a-254d used to scan vertically to cover potential obstacles at different altitudes. As discussed above, a 3D laser radar typically scans in two planes, e.g., horizontal and vertical. In the horizontal plane, an electric motor (e.g., a spinning device 127, shown in FIG. 1B) can be used to drive the laser beams emitted by a light emitting module 254 to rotate and scan in a 360-degree range.

In the vertical plane, in order to cover potential obstacles at different altitudes, one approach (as shown in FIG. 2) is to use multiple laser beams, with each laser beam configured to cover obstacles at a different altitude. This approach requires multiple laser emitters (e.g., emitters 254a-254d) to operate simultaneously, which increases cost, power consumption, and weight of the unit. Moreover, in many applications (e.g., those where one of the primary objectives for utilizing LIDAR is collision avoidance from stationary objects during flight), using multiple laser emitters in the LIDAR may be not only costly but also wasteful. Often times, in these applications, a single laser emitter is sufficient for purposes of the specific application (e.g., for performing obstacle detection and avoidance during flight) because only obstacles ahead in a single direction (e.g., the flight direction) are of interest. However, using a single-line LIDAR module may also have drawbacks.

Figure 3A:
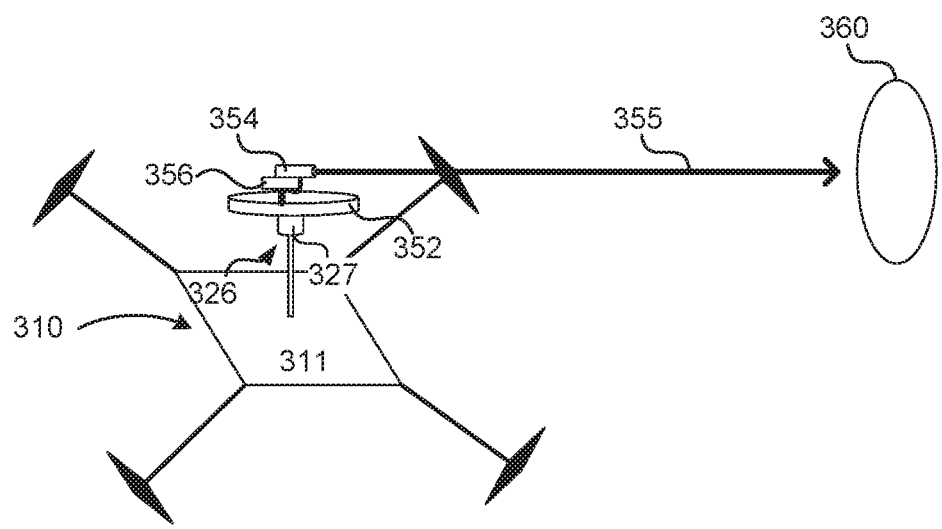
FIGS. 3A-3B illustrate an example deficiency observed in an embodiment implementing a single-line laser using a single-axis rotation mechanism in operation.
Figure 3B:
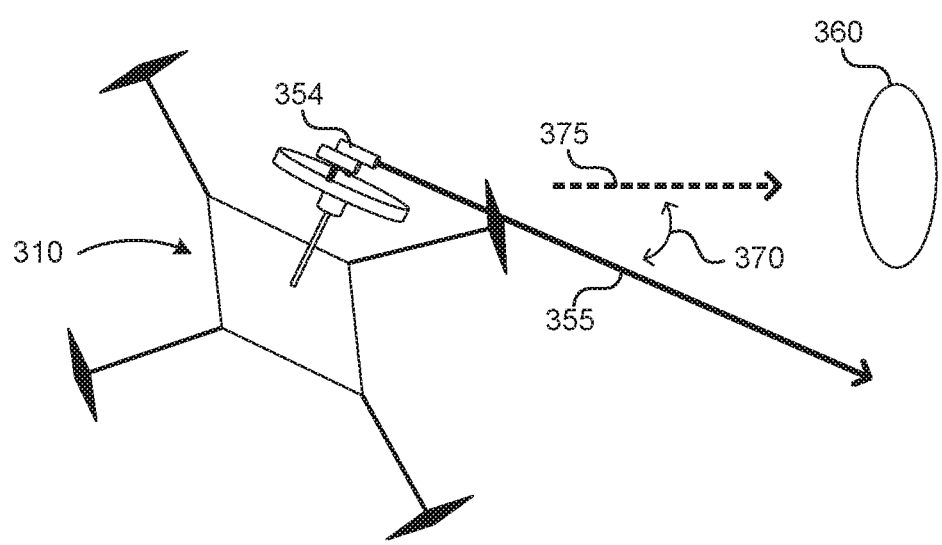

FIGS. 3A-3B illustrate an example deficiency observed in an embodiment implementing a single-line laser using a single-axis rotation mechanism in operation. As shown in FIGS. 3A-3B, to detect an obstacle 360 in front of a UAV 310, a single-line LIDAR module with a single laser emitter 354 (that emits a single-line laser signal 355) is installed on a single-axis rotation mechanism 326 via a scanning platform 352.

Specifically, in the example shown in FIG. 3A, the laser emitter 354 emits the laser signal 355 at a frequency (e.g., 1000 Hz or 3600 Hz), under the control of a program executed by a main control unit (e.g., the controller 142, shown in FIG. 1A). When the signal 355 encounters the obstacle 360, the signal 355 is reflected by the obstacle 360, and the reflected signal is detected by a light sensor 356 in the LIDAR module. Via a spinning device 327 (e.g., an electric motor), the single-line LIDAR can perform scanning (e.g., a 360-degree scan) in the horizontal plane. The scanning frequency (e.g., expressed as revolutions per second) can be controlled by the rotating electric motor, either manually through a remote controller (e.g., controller 144, FIG. 1A) or a computer program stored in the storage medium (e.g., medium 143, FIG. 1A) coupled to the controller onboard the UAV 310. In this way, the main controller or another module can calculate the distance from the UAV 310 to the obstacle 360 based on a time difference between the emittance of the laser light 355 and the detection of the reflected laser light. This process accordingly implements a single-direction obstacle detection and range estimation function. Note that, because the LIDAR module is connected to the UAV 310 through a single-axis rotation mechanism 326 (e.g., via a bracket), the scanning platform 352 that carries the LIDAR module is generally parallel to the main body 311 of the UAV 310, such that the scanning plane of the single-line LIDAR can be parallel to the main body 311.

However, as shown in FIG. 3B, during flight of the UAV 310, the vehicle's pitch angle or attitude 370 can change with the flight speed and acceleration in a given direction. For example, typically when the UAV 310 flies at a low and constant speed, the vehicle's attitude 370 can be roughly parallel to the ground; however, when the same vehicle flies at a higher speed or accelerates, the vehicle's attitude 370 may decrease so that the vehicle is tilted down (e.g., by about 30 degrees). If there is an obstacle 360 in the motion direction 375 of the UAV 310 during an acceleration and the scanning direction (as represented by the single-line laser signal 355) of the LIDAR deviates significantly from the motion direction 375, then the single-line LIDAR may be unable to detect the obstacle 360.

2. Representative Embodiments

Techniques described below implement a multi-axis (e.g., dual-axis) motion mechanism that, in addition to the spinning device described above (e.g., the spinning device 127, shown in FIG. 1B), includes at least a tilting device to provide an additional degree of freedom. The tilting device can be configured to adjust the scanning direction such that the single-line laser can consistently aim in the direction of travel (e.g., at least once per revolution), regardless of the attitude of the main body of the vehicle. The adjustment can be performed based on, for example, an orientation sensor (e.g., an inertial measurement unit (IMU)) carried by the main body of the vehicle. The IMU can include, for example, a gyroscope, an accelerometer, a rotary encoder, a Hall effect sensor, or any suitable combination thereof. In some embodiments, through the multi-axis motion mechanism, the single-line laser can be instructed to aim at other directions as well, e.g., for purposes of range estimation of a certain object or for conducting 3D scanning of the local terrain. Because this approach enables implementing LIDAR obstacle detection using as few as one pair of laser emitting and sensing devices, the cost and complexity of the LIDAR module on the UAV can be greatly reduced, making a single-line LIDAR module more suitable than the traditional multi-line LIDAR scanners for cost-sensitive, small to medium sized unmanned aerial vehicle applications.

Figure 4:
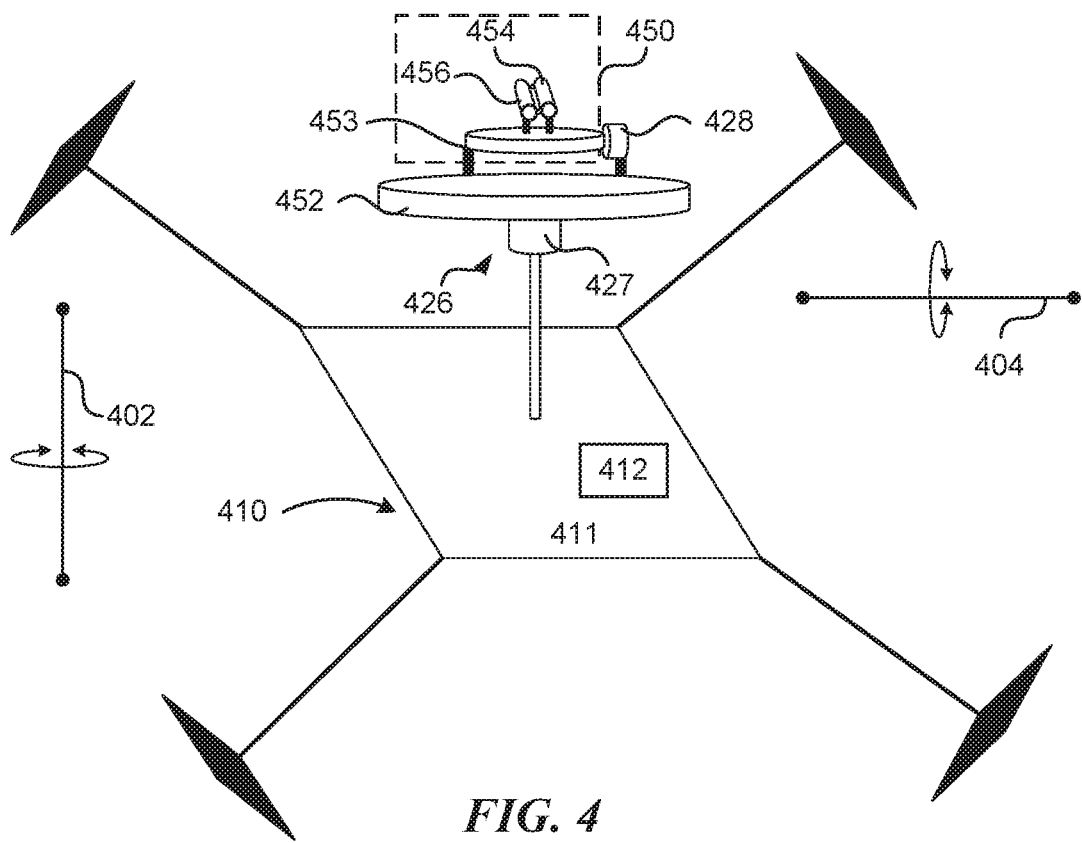
FIG. 4 is a schematic illustration of an approach that employs a dual-axis motion mechanism to perform both horizontal and vertical scans, in accordance with an embodiment of the present technology.
Figure 5:
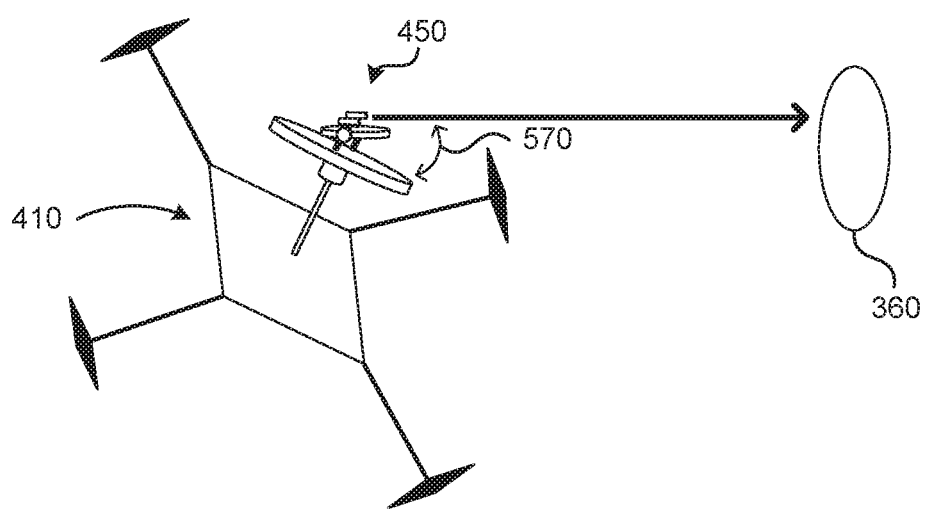
FIG. 5 illustrates an embodiment implementing a dual-axis motion mechanism operating in accordance with embodiments of the present technology.

FIG. 4 is a schematic illustration of an approach that employs a multi-motor (e.g., dual-motor) mechanism 426 on a UAV 410 to perform both horizontal and vertical scans, in accordance with an embodiment of the present technology. FIG. 5 illustrates an embodiment implementing a single-line laser using a dual-motor mechanism in operation. With simultaneous reference to FIGS. 4 and 5, embodiments of the present technology are further described below.

Specifically, the dual-motor motion mechanism 426 can include a spinning motor 427 and a tilting motor 428 to perform both horizontal and vertical scans. This approach can achieve 3D scanning using a single-line laser (e.g., from a single laser diode). The UAV 410 carries a single-line LIDAR module 450. Included in the LIDAR module 450 is a laser emitter 454, which can contain a laser diode and one or more lenses for collimating or other purposes. In a manner that same as or similar to the single-line LIDAR modules described above, the LIDAR module 450 can be controlled by a main control unit (e.g., controller 142, shown in FIG. 1A) on the UAV 410 to emit a pulse laser signal. The LIDAR module 450 further includes a light sensor 456, which can include, e.g., a focusing lens, a photodiode, and an analog-to-digital converter (ADC). The ADC can convert a detected optical signal into an electrical signal and output the electrical signal to the main control unit, which can in turn perform, for example, obstacle detection, terrain survey, or collision avoidance. Elements of the LIDAR module 450 including, for example, the light emitter 454 and the light sensor 456, are installed on or otherwise carried by a scanning platform 453.

As shown in FIG. 4, a single-line LIDAR module 450 with a single laser emitter 454 is installed on a multi-axis motion mechanism 426 via the scanning platform 453. The motion mechanism 426 includes at least two servo motors (e.g., electric motors), e.g., a spinning motor 427 and a tilting motor 428. The spinning motor 427 and the tilting motor 428 can be used to control the scanning operation of the LIDAR module 450 in the horizontal plane and the vertical plane, respectively. Similar to the motion mechanism 126 described above with respect to FIG. 1B, the spinning motor 427 is operable to rotate the scanning LIDAR module 450 relative to the main body 411 of the UAV 410 about a spin axis 402. In some embodiments, the spinning motor 427 can spin the LIDAR module 450 at a generally constant rate (e.g., ±10%). In certain examples, the rate is approximately 10 to 20 revolutions per second (r.p.s.). Depending on the implementation, the spinning can be either controlled by the main controller onboard the UAV 410 or by another suitable circuit. In other embodiments, the spinning motor 427 can be a simple constant speed motor. In particular embodiments (e.g., where the scanning module 450 is constantly spinning), the scanning module 450 together with the motion mechanism 426 can be weight balanced relative to the spin axis 402.

The tilting motor 428 can be operable to rotate the scanning LIDAR module 450 about an additional axis 404 that is transverse to the spin axis 402, in response to a tilt angle input. In some examples, the additional axis 404 is perpendicular to the spin axis 402. Further, an orientation sensor 412 can be carried by the main body 411. Examples of the orientation sensor 412 can include an IMU, which may include a gyroscope, an accelerometer, a rotary encoder, a Hall effect sensor, or any combination of sensors suitable for detecting the pitch angle of the main body 411 in a timely and accurate manner. According to a number of embodiments of the present technology, a controller on the UAV 410 (e.g., the main controller 142, shown in FIG. 1A) can be configured to receive an orientation signal from the orientation sensor 412 and, based at least in part on the orientation signal, determine a tilt value for the tilt angle input of the tilting motor 428. Through the orientation sensor 412 installed on the UAV 410, a current attitude (or pitch angle) 570 of the vehicle 410 can be obtained. The controller can be configured to compensate for the pitch angle 570 of the main body 411 when the main body 411 is not level, for example, by directing the tilting motor 428 to cause the scanning platform 453 to become level. Therefore, during operation of the UAV 410, the controller can obtain the pitch angle 570 and use that information to control the tilting motor 428 to compensate for the pitch angle. Accordingly, the direction of the LIDAR laser beam emitted by the LIDAR module 450 can be consistently aligned with the direction of the flight of the vehicle 410, so as to detect the obstacle 360. In this way, the motion mechanism 426 and the scanning LIDAR module 450 are able to detect obstacles even when the main body 411 is tilted.

Note that, during operation, the motion mechanism 426 may cause the scan plane of single-line LIDAR module 450 to change, and more specifically, to become conical rather than flat. However, this result generally does not adversely affect the obstacle detection and collision avoidance processes, because the scanning platform 452c becomes level at least once each time the scanning LIDAR module 450 rotates 360 degrees. In other words, as long as the tilt angle is adjusted by the controller such that the scanning LIDAR module 450 is level (or otherwise aligned with the vehicle direction of motion) at least once per revolution as the scanning module 450 spins, it is generally sufficient for the module 450 to detect the obstacle 360 in the direction of flight.

Figure 6A:
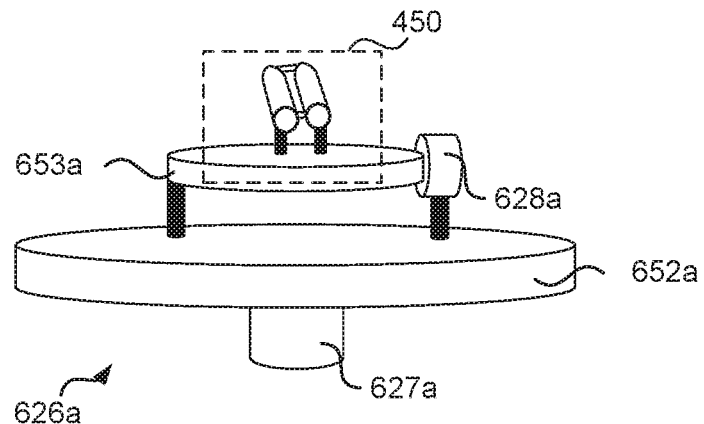
FIGS. 6A-6C illustrate devices in accordance with several embodiments of the present technology.
Figure 6B:
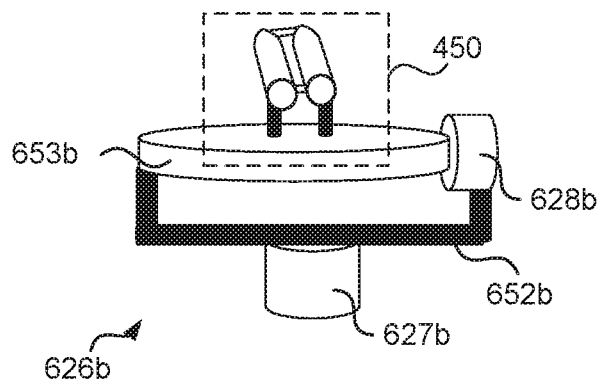
Figure 6C:
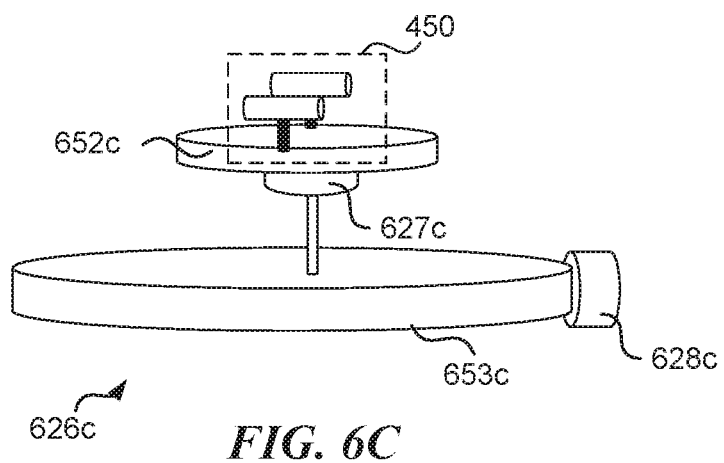

FIGS. 6A-6C illustrate several systems in accordance with embodiments of the present technology. As shown in FIG. 6A, the system can include a motion mechanism 626a having a dual-axis configuration that includes an intermediate platform 652a that is rotated by a spinning device 627a. A tilting device 628a is carried by the intermediate platform 652a to tilt a scanning platform 653a. That is to say, the spinning device 627a is configured to rotate the scanning element (e.g., the LIDAR module 450) via the intermediate platform 652a, with the spinning device 627a carrying the tilting device 628a.

FIG. 6B illustrates another embodiment that includes a motion mechanism 626b having a dual-axis configuration. A corresponding intermediate platform 652b is simplified to have the shape/configuration of a rod. The intermediate platform 652b is rotated by a corresponding spinning device 627b. A corresponding tilting device 628b is carried by the intermediate platform 652b and is positioned to tilt a corresponding scanning platform 653b.

FIG. 6C illustrates a corresponding motion mechanism 626c configured in accordance with another embodiment of the present technology. The motion mechanism 626c is also a dual-axis motion mechanism; however, in this embodiment, it is a tilting device 628c that carries a corresponding spinning device 627c. Specifically, the tilting device 628c can tilt an intermediate platform 653c, which in turn carries the spinning device 627c. The spinning device 627c, carried by the intermediate platform 653c, rotates a corresponding scanning platform 652c. That is to say, the tilting device 627c is configured to tilt the scanning element (e.g., the LIDAR module 450) via the intermediate platform 653c.

Figure 7:
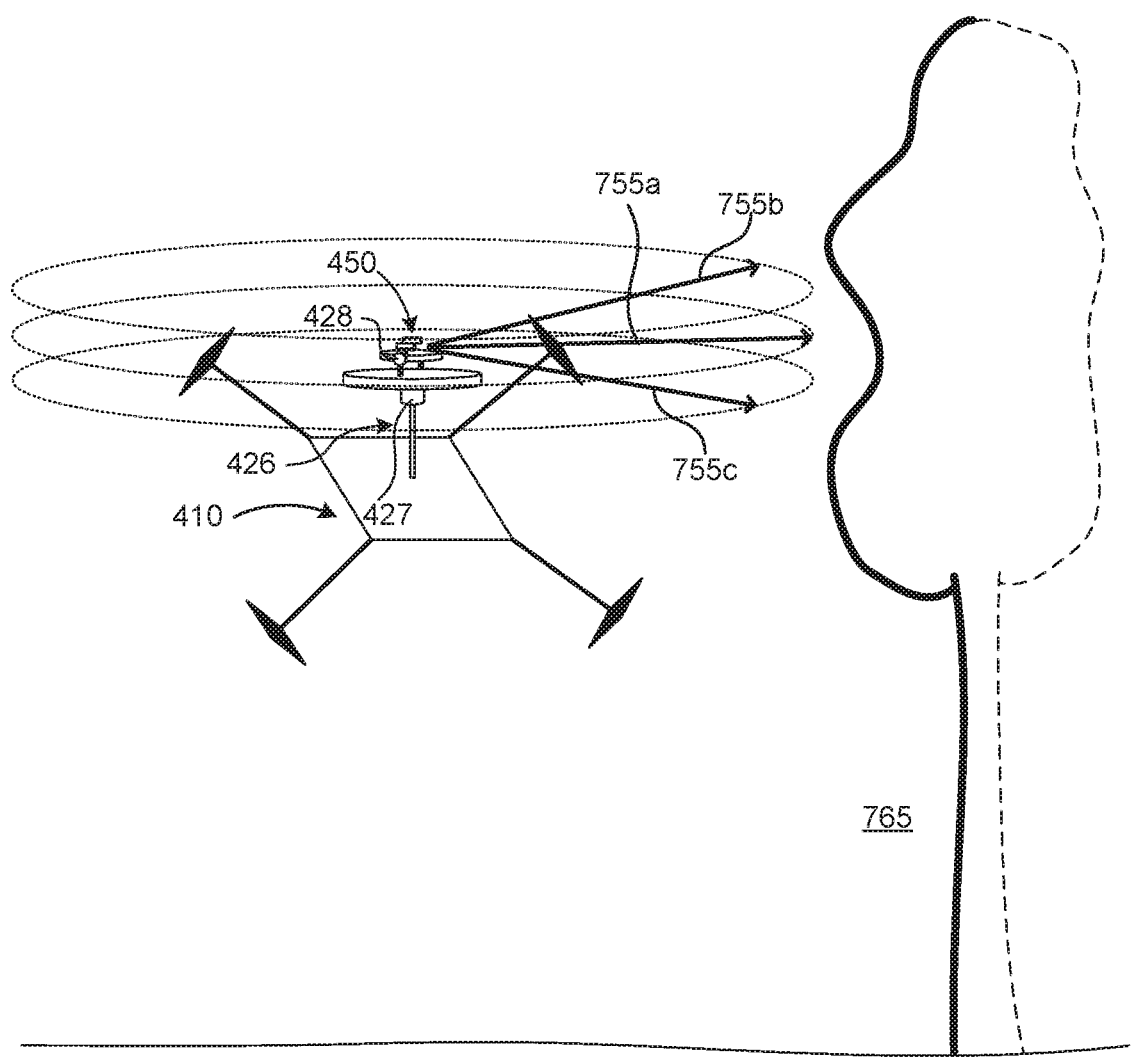
FIG. 7 illustrates an additional function that embodiments of the present technology can be configured to perform.

FIG. 7 illustrates an additional function that embodiments of the present technology can perform. In particular, with the multi-axis motion mechanism described herein, embodiments of the present technology can enable 3D scanning using a single-line LIDAR. Specifically, when the vehicle 410 is stationary (e.g., hovering in flight or positioned on the ground), the optoelectronic scanning platform can be tilted (e.g., by the tilting motor 428) to aim at any angle, thereby achieving 3D scanning of the terrain 765 and obstacle range detection for various altitudes that are within the range of the tilting device.

For example, after directing the UAV 410 to level, the controller onboard the UAV 410 can first cause the spinning device 427 of the motion mechanism 426 to rotate the single-line LIDAR for 360 degrees while the tilting device 428 is at a first tilt angle, thereby performing a first scan 755a. Afterwards, the controller onboard the UAV 410 can cause the spinning device 427 to rotate the single-line scanning element (e.g., scanning module 450) 360 degrees with the tilting device 428 at different tilt angle, thereby performing subsequent scans (e.g., scans 755b and 755c) at different altitudes. In this way, a 3D depth drawing (such as is shown by the contours of the terrain 765 in FIG. 7) can be plotted, by gradually changing the vertical scanning direction. With the motion mechanism described herein, a single-line LIDAR scanner can be configured to perform terrestrial survey, obstruction detection, or more.

In some embodiments, the detected terrain information can be used in combination with other data such as other vehicle orientation information produced by sensors onboard the UAV, and the controller can maneuver the UAV in response to the terrain or obstacle detected by the scanner, thereby achieving independent positioning and autonomous flying.

3. Conclusion

From the foregoing, it will be appreciated that specific embodiments of the technology have been described herein for purposes of illustration, but that various modifications can be made without deviating from the technology. In representative embodiments, the LIDAR devices can have configurations other than those specifically shown and described herein, including other semiconductor constructions. The optical devices described herein may have other configurations in other embodiments, which also produce the desired beam shapes and characteristics described herein. While representative embodiments were described above in the content of small to medium sized UAVs, aspects of the technology described herein can be applied to other UAVs and/or other vehicles in other embodiments.

Certain aspects of the technology described in the context of particular embodiments may be combined or eliminated in other embodiments. For example, aspects of the optical structure described in the context of FIGS. 6 and 7 may be applied to embodiments other than those specifically shown in the Figures. Further, while advantages associated with certain embodiments of the technology have been described in the context of those embodiments, other embodiments may also exhibit such advantages, and not all embodiments need necessarily exhibit such advantages to fall with within the scope of the present technology. Accordingly, the present disclosure and associated technology can encompass other embodiments not expressly shown or described herein.

To the extent any materials incorporated herein by reference conflict with the present disclosure, the present disclosure controls.

At least a portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

We claim:

1. An unmanned movable object, comprising:
a main body;
an orientation sensor carried by the main body;
a scanning element carried by the main body;
a motion mechanism coupled between the main body and the scanning element, the motion mechanism including a spinning device and a tilting device, wherein the spinning device is operable to rotate the scanning element relative to the main body about a spin axis, and wherein the tilting device is operable to rotate the scanning element about an additional axis that is transverse to the spin axis in response to a tilt angle input; and
a controller configured to receive an orientation signal from the orientation sensor and, based at least in part on the orientation signal, determine a tilt value for the tilt angle input,
wherein the scanning element includes a scanner, the controller being configured to maneuver the unmanned movable object in response to terrain or an obstacle detected by the scanner included in the scanning element.

2. The unmanned movable object of claim 1, wherein the motion mechanism further includes an intermediate platform that the spinning device is configured to rotate, and wherein the tilting device is carried by the intermediate platform.

3. The unmanned movable object of claim 2, wherein the spinning device is configured to rotate the scanning element via the intermediate platform.

4. The unmanned movable object of claim 1, wherein the spinning device carries the tilting device.

5. The unmanned movable object of claim 1, wherein the motion mechanism further includes an intermediate platform that the tilting device is configured to rotate, and wherein the spinning device is carried by the intermediate platform.

6. The unmanned movable object of claim 1, wherein the controller is configured to tilt the scanning element toward a direction of travel of the unmanned movable object.

7. The unmanned movable object of claim 1, wherein the controller is configured to compensate for a tilt angle of the main body when the main body is not level.

8. The unmanned movable object of claim 1, wherein the controller is configured to compensate for a tilt angle of the main body by directing the scanning element to become level.

9. The unmanned movable object of claim 1, wherein the controller is configured to adjust a tilt angle of the scanning element by directing the scanning element to become level at least once per revolution when the scanning element spins.

10. The unmanned movable object of claim 1, wherein the scanning element further includes a scanning platform that carries the scanner.

11. The unmanned movable object of claim 1, wherein the scanner is configured to perform terrestrial survey, obstruction detection, or a combination thereof.

12. The unmanned movable object of claim 1, wherein the scanner comprises a light detection and ranging (LIDAR) system.

13. The unmanned movable object of claim 1, wherein the controller is configured to:
   direct the unmanned movable object to level;
   rotate the scanning element to perform a first scan at a first tilt angle; and
   rotate the scanning element to perform a second scan at a second tilt angle.

14. A non-transitory computer readable medium storing instructions which, when executed, cause a controller to:
   receive an orientation signal from an orientation sensor carried by a main body of an unmanned movable object;
   determine a tilt value based at least in part on the orientation signal;
   output the tilt value to a motion mechanism carried by the unmanned movable object, wherein the motion mechanism is operable to (1) cause a scanning element to rotate relative to the main body about a spin axis, and (2) cause the scanning element to rotate about an additional axis that is transverse to the spin axis in response to the tilt value; and
   maneuver the unmanned movable object in response to terrain or an obstacle detected by a scanner included in the scanning element.

15. A method for operating an unmanned movable object, the method comprising:
   directing the unmanned movable object to level;
   rotating a scanning element carried by the unmanned movable object to perform a first scan at a first tilt angle;
   rotating the scanning element to perform a second scan at a second tilt angle; and
   maneuvering the unmanned movable object in response to terrain or an obstacle detected by a scanner included in the scanning element,
   wherein the scanning element is coupled to the unmanned movable object via a motion mechanism that is operable to (1) cause the scanning element to rotate relative to a main body of the unmanned movable object about a spin axis, and (2) cause the scanning element to rotate about an additional axis that is transverse to the spin axis in response to a tilt angle input.

* * * * *